United States Patent [19]

Volejnik

[11] Patent Number: 4,841,548
[45] Date of Patent: Jun. 20, 1989

[54] METHOD AND APPARATUS FOR EXTRACTING AN AUXILIARY DATA CLOCK FROM THE CLOCK AND/OR THE CLOCK-PHASE OF A SYNCHRONOUS OR PLESIOCHRONIC DIGITAL SIGNAL

[75] Inventor: Wilhelm Volejnik, Sauerlach, Fed. Rep. of Germany

[73] Assignee: Siemens Aktiengesellschaft, Berlin and Munich, Fed. Rep. of Germany

[21] Appl. No.: 116,663

[22] Filed: Nov. 4, 1987

[30] Foreign Application Priority Data

Nov. 27, 1986 [DE] Fed. Rep. of Germany ....... 3640431

[51] Int. Cl.$^4$ ............................................... H04L 7/02
[52] U.S. Cl. ...................................... 375/110; 375/111
[58] Field of Search ............... 375/108, 106, 110, 111, 375/118

[56] References Cited

U.S. PATENT DOCUMENTS

| 3,582,789 | 6/1971 | Mick | 375/110 |
| 3,731,219 | 5/1973 | Mader et al. | 331/14 |
| 4,661,965 | 4/1987 | Maru | 375/110 X |

FOREIGN PATENT DOCUMENTS

| 2641547 | 3/1978 | Fed. Rep. of Germany . |
| 59-106019 | 6/1984 | Japan . |
| 8301625 | 12/1984 | Netherlands . |

OTHER PUBLICATIONS

"Telecom Report", vol. 9, No. 3, 1986, pp. 190–197.

Primary Examiner—Derek S. Jennings
Attorney, Agent, or Firm—Hill, Van Santen, Steadman & Simpson

[57] ABSTRACT

A method and apparatus for recovering the clock and-/or the clock phase of a synchronous or plesiochronic digital signal provide that logic circuits in gate arrays or cell arrays recover the clock. In an auxiliary clock generator, an auxiliary clock is generated, or auxiliary clocks of the same frequency and different phase relationship extracted therefrom are generated which, conducted by way of a phase correction facility, provide an auxiliary data clock as the recovered clock. In principle, the frequency of the auxiliary clock or auxiliary clocks deviates from that of the auxiliary data clock to be formed. A phase sensor checks whether the active edges of the digital signal and of the auxiliary data clock have approached each other to less than a predetermined time interval and emits a corrections signal as soon as such an event occurs. This signal causes a phase shifting of the auxiliary data clock by switching between the extracted auxiliary clocks and/or by reversing the polarity of the auxiliary clock or of the extracted plurality of auxiliary clocks.

14 Claims, 6 Drawing Sheets

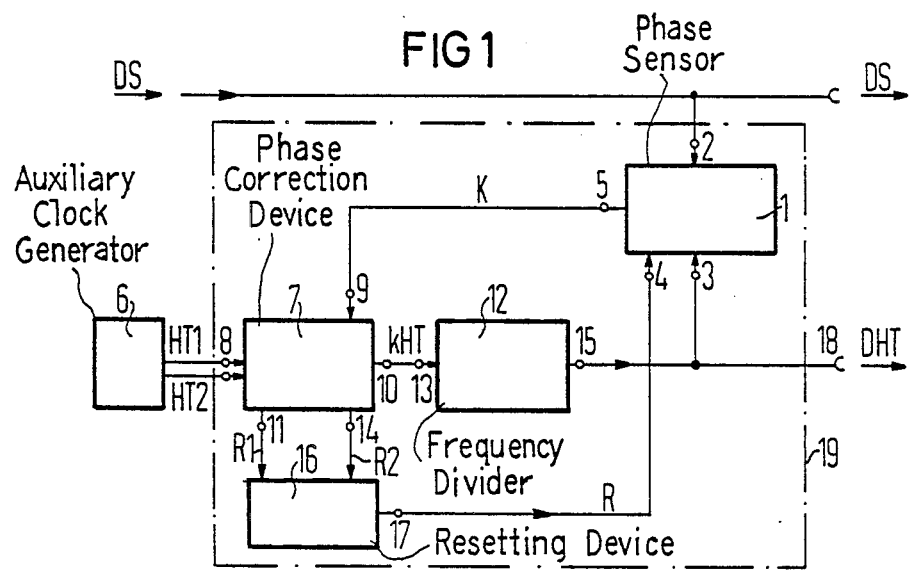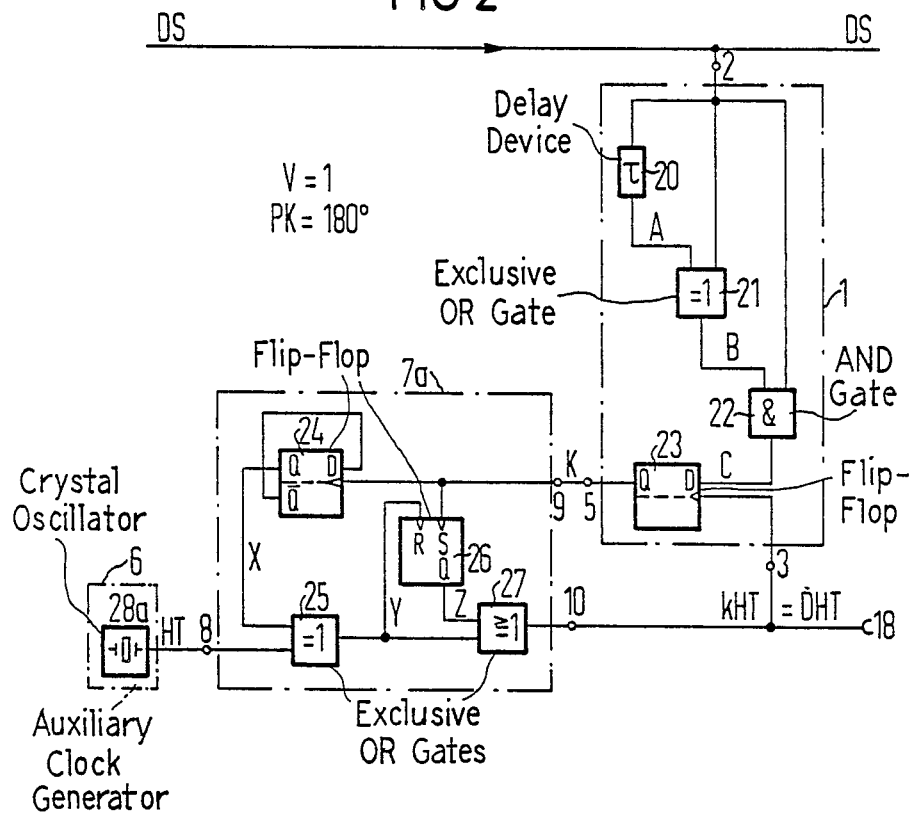

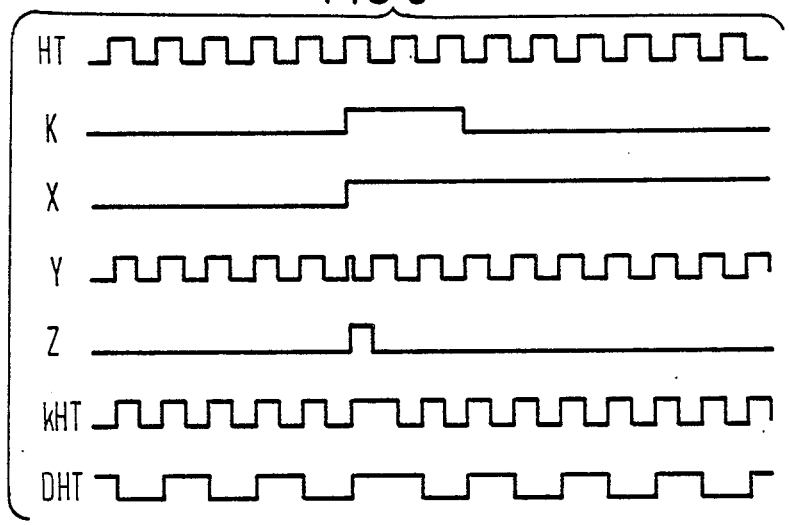
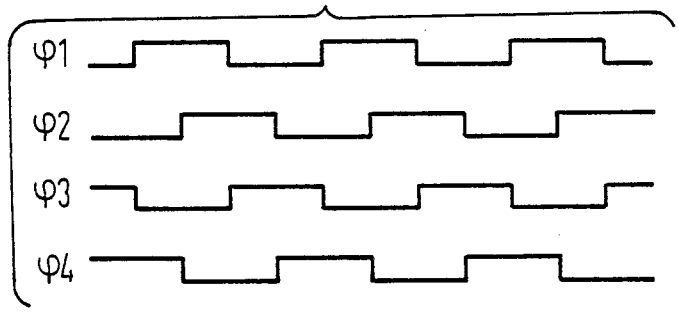

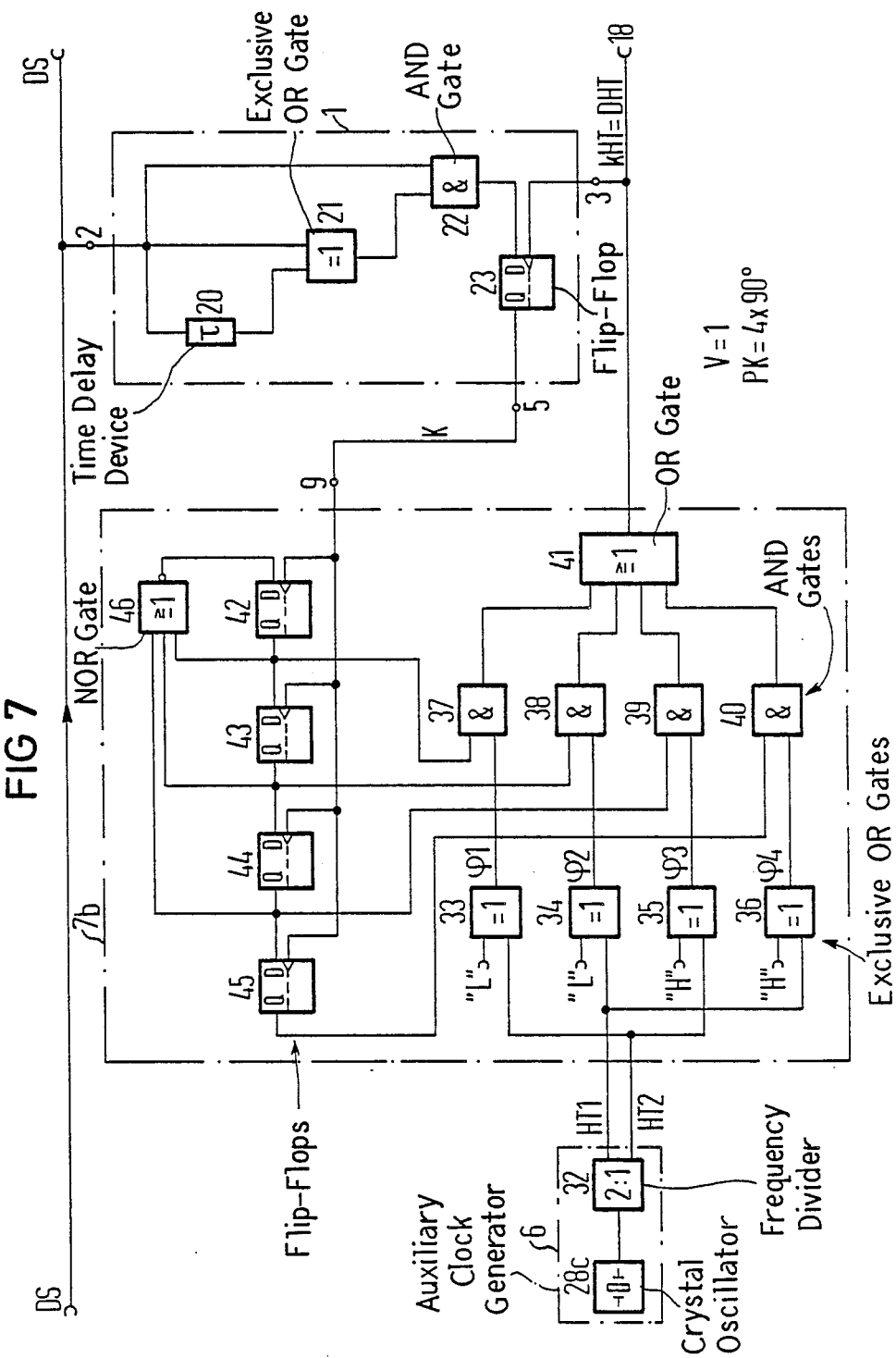

METHOD AND APPARATUS FOR EXTRACTING AN AUXILIARY DATA CLOCK FROM THE CLOCK AND/OR THE CLOCK-PHASE OF A SYNCHRONOUS OR PLESIOCHRONIC DIGITAL SIGNAL

BACKGROUND OF THE INVENTION

1. Field of the Invention

The present invention relates to a method and to an arrangement for extracting an auxiliary data clock from the clock and/or the clock phase of a synchronous or plesiochronic digital signal.

2. Description of the Prior Art

From the incoming digital signals at the inputs of devices for transmitting or processing digital signals, their clock must be recovered. A corresponding clock recovery facility TR is disclosed, for example, as a block in FIG. 4 of the periodical "telecom report", Vol. 9, No. 3, 1986, pp. 190–197.

The clock frequency of the plesiochronic digital signals correspond to a nominal value, with a slight relative deviation, the permissible maximum value of which is typically of the order of magnitude of a few times $10^{-5}$. As far as can be technically implemented, the clock frequency of synchronous signals in the mean corresponds accurately to a nominal value. Interfering influences in electric circuits and on the transmission path have the effect that the instantaneous frequency of synchronous signals also slightly deviates from the nominal value. Therefore, there is no significant difference between the two types of signals with regard to the problem of clock recovery. Therefore, the illustrative embodiments of the present invention are restricted to plesiochronic signals.

SUMMARY OF THE INVENTION

The present invention has the object of providing a method and an apparatus for carrying out the method which can be exclusively implemented by way of logic circuits, for example in gate arrays or cell arrays. Test from calibration work should not be required. It should be possible to utilize inexpensive semiconductor technology such as complementary-metal-oxide-semiconductor (CMOS) technology even with digital signals of a high bit rate, such as 34 Mbit/s.

Starting with a method of the type initially set forth, the above object is achieved, according to the present invention, by the fact that an auxiliary clock is generated, the frequency of the clock being selected as a single or multiple factor of the nominal value of the frequency of the digital signal with the addition of either a positive or negative frequency deviation which is greater than a permissible frequency deviation, multiplied by the value of the single or multiple factor, of the digital signal but at a maximum 10% of the frequency, multiplied by the single or multiple factor, of the digital signal. The invention is also characterized in that the auxiliary clock has a frequency within the range of a single factor of the nominal value of the frequency of the digital signal and is used directly as an auxiliary data clock and the auxiliary clock having a frequency within the range of a multiple factor of this nominal value is used as an auxiliary data clock after a frequency division by a dividing factor equal to the multiple factor the nominal value. A check is made as to whether the active edges of the digital signal and of the auxiliary data clock have approached each other to less than a defined time interval. In such a case, a single correction signal is generated and the generation of further correction signals is inhibited. After the occurrence of a correction signal, the phase of the auxiliary data signal is shifted by polarity reversal in such a manner that the time interval between the active edges of the digital signal and of the auxiliary data clock is greater than the defined time interval. After conclusion of the phase correction process and any frequency division, the inhibition of the generation of correction signals is canceled and a new check is made as to whether the active edges of the digital signal and of the auxiliary data clock have again approached each other to less than the defined time interval and that, in such a case, the generation of a signal correction signal, the inhibition of further correction signals, the shifting and the check are repeated.

The auxiliary data clock is used for clocking the digital signal containing the data in a known manner, for example with the aid of a D-type flip-flop, in a circuit following the phase recovery circuit. Depending on the technology used, this is done by way of the positive or negative edge of the auxiliary data clock which is then called the active edge. It is of no importance to the invention which of the edges is used.

An advantageous variation of the method of the present invention lies in the fact that auxiliary clocks are extracted from the auxiliary clock which have the same frequency with respect to one another, but different phase relationships, that the auxiliary clock or one of the extracted auxiliary clocks having a frequency within the range of the single factor of the nominal value of the frequency of the digital signal is used directly as an auxiliary data clock and the auxiliary clock or one of the extracted auxiliary clocks having a frequency within the range of a multiple factor of the nominal value is used as an auxiliary clock after a frequency division by a dividing factor equal to the multiple factor of the nominal value and that the phase shifting of the auxiliary data clock is effected by switching between the extracted auxiliary clocks and/or by polarity reversal of the auxiliary clock or of the extracted auxiliary clocks.

BRIEF DESCRIPTION OF THE DRAWINGS

Other objects, features and advantages of the invention, its organization, construction and operation will be best understood from following detailed description, taken in conjunction with the accompanying drawings, on which:

FIG. 1 is a basic circuit diagram of a clock recovery circuit constructed in accordance with the present invention;

FIG. 2 is a circuit diagram of a clock recovery circuit constructed in accordance with the present invention;

FIG. 6 is a pulse diagram for the clock recovery facility according to FIG. 5;

FIG. 7 is a basic circuit diagram of a third illustrative embodiment of a clock recovery circuit constructed in accordance with the present invention;

FIG. 8 is a pulse diagram for the clock recovery circuit according to FIG. 7.

DESCRIPTION OF THE PREFERRED EMBODIMENTS

Figure 3:
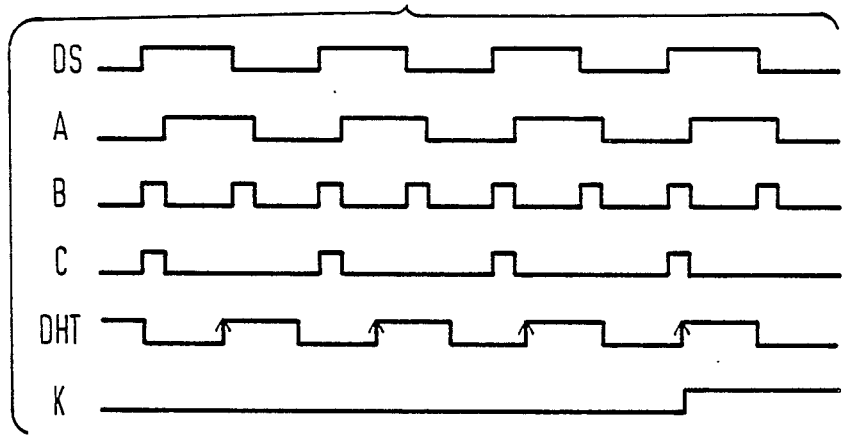
FIG. 3 is a pulse diagram for the phase sensor of FIG. 2.

Referring to FIG. 1, a basic circuit diagram illustrates a clock recovery facility constructed in accordance with the present invention. The clock recovery circuit comprises an auxiliary clock generator 6, a phase correction device 7, a phase sensor 1 and, possibly, a frequency divider 12, and a resetting device 16.

The auxiliary clock generator 6 generates an auxiliary clock HT and, possibly, further auxiliary clocks HT1, HT2, ... HTn, which are extracted from the auxiliary clock HT and have the same frequency, but differing phase relationships with respect to one another.

The phase correction device 7 receives, at its input or its inputs 8, the auxiliary clock HT and/or the extracted auxiliary clocks HT1, HT2, ... HTn and selects, under the control of the correction signal K at a correction signal input 9, one of the auxiliary clocks or reverses the polarity of one of the auxiliary clocks. The result is a corrected auxiliary clock kHT at an output 10. Depending on the dimensioning, this is either supplied directly to an output 18 and is there called an auxiliary data clock DHT or is supplied to an input 13 of a frequency divider 12 and is emitted as an auxiliary data clock BHT only at the output 15 of the latter.

The phase sensor 1 consists of a circuit, the output of which changes from a state of rest to a correction state when the active edge of the auxiliary data clock DHT approaches one edge of the digital signal DS to less than a fixed predetermined time interval $\Delta t$. Since the instantaneous frequencies differ slightly from the clock of the digital signal DS and from the auxiliary data clock DHT, this state will invariably occur after a certain time.

The change from the rest state to the correction state results in a single phase correction of the corrected auxiliary clock kHT in such a manner that the clock edges which are active for the subsequent frequency divider 12 are advanced in time if the auxiliary clock frequency f, which is possibly divided by V, is slower than a frequency F of the digital signal DS, and in such a manner that the clock edges active for the subsequent frequency divider 12 are retarded in time if the auxiliary clock frequency f, divided by V, is faster than the frequency F of the digital signal DS.

Therefore, a phase correction has the effect that one period of the auxiliary data clock DHT generated by the frequency divider 12 is shortened or extended, depending on whether the auxiliary clock frequency f is too slow or too fast. As a result, the time interval between the active edges of the auxiliary data clock DHT and the edges of the digital signal DS increases to a value which is greater than the value $\Delta t$.

Due to the frequency difference between the clock of the digital signal DS and the auxiliary data clock DHT, the edges approach each other again and the process is repeated as described above after the interval drops below the time interval $\Delta t$.

If resetting does not occur automatically at the phase sensor 1, a resetting device 16 is also provided which receives from the reset signal outputs 11 and 14 of the phase correction device 7, after phase correction and frequency division, reset signals R1 and R2 which it then supplies at the output 17 as a reset signal R to the reset input 4 of the phase sensor 1. Apparatus constructed in accordance with the present invention provides the possibility of digital clock recovery even with digital signals DS, the frequency of which approaches the processing speed of any semiconductor technology used. The phase sensor 1, the phase correction device 7, the frequency divider 12 and the resetting device 16 can be implemented as an integrated circuit 19.

FIG. 2 illustrates a clock recovery circuit according to FIG. 1 for a single factor of the nominal value of the frequency F of the digital signal DS at the input 2 and a phase correction PK=180° by means of polarity reversal.

The phase sensor 1 comprises a delay device 20, an EXCLUSIVE OR gate 21, an AND gate 22 and a D-type flip-flop 23.

FIG. 3 illustrates the operation of the phase sensor 1 according to FIG. 2. The top pulse diagram is the digital signal DS at the input 2. The second pulse is designated A and represents the signal DS delayed by the delay device 20. The third pulse B is the output signal of the EXCLUSIVE OR gate 21, to the inputs of which the digital signal DS and the pulse A were applied. The fourth pulse C is the result of ANDing the digital signal DS with the pulse B in the AND gate 22. The fifth pulse is the auxiliary data clock DHT at the input 3 of the phase sensor 1. The active edges of the auxiliary data clock DHT are marked by an arrow. The D-type flip-flop 23 emits the correction signal K at an output Q which is the output 5 of the flip-flop 23 when a pulse C coincides in time with an active edge of the auxiliary data clock DHT, which is indicated by the sixth pulse diagram.

The phase correction device 7a in FIG. 2 comprises a D-type flip-flop 24, an EXCLUSIVE OR gate 25, an RS flip flop 26 and an OR gate 27.

Figure 4:
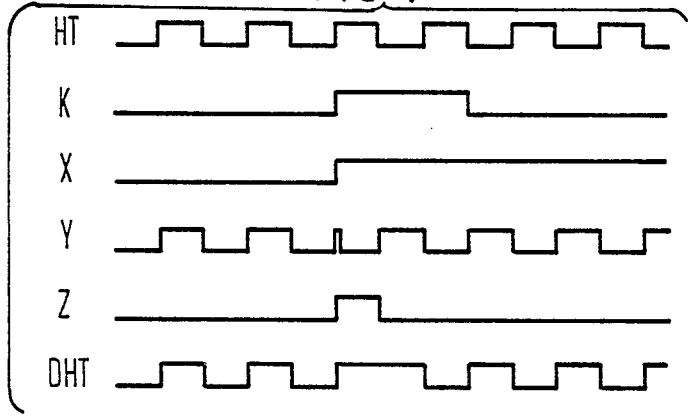
FIG. 4 is a pulse diagram for the phase correction facility according, to FIG. 2.

FIG. 4 shows the operation of the phase correction device 7a according to FIG. 2. The top pulse is the auxiliary clock HT emitted by a crystal oscillator 28a in the auxiliary clock generator 6, at an input 8 of the phase correction device 7a. The second pulse is the correction signal K at an input 9 of the phase correction device 7a. The third pulse X is the signal at an output Q of the D-type flip-flop 24 which operates as a toggling stage. The fourth pulse Y is the output signal of the EXCLUSIVE OR gate 25, while the fifth pulse Z is the signal at the Q output of the RS flip-flop 26 and the sixth pulse is the auxiliary data clock DHT at the output 10 of the phase correction device 7a.

Figure 5:
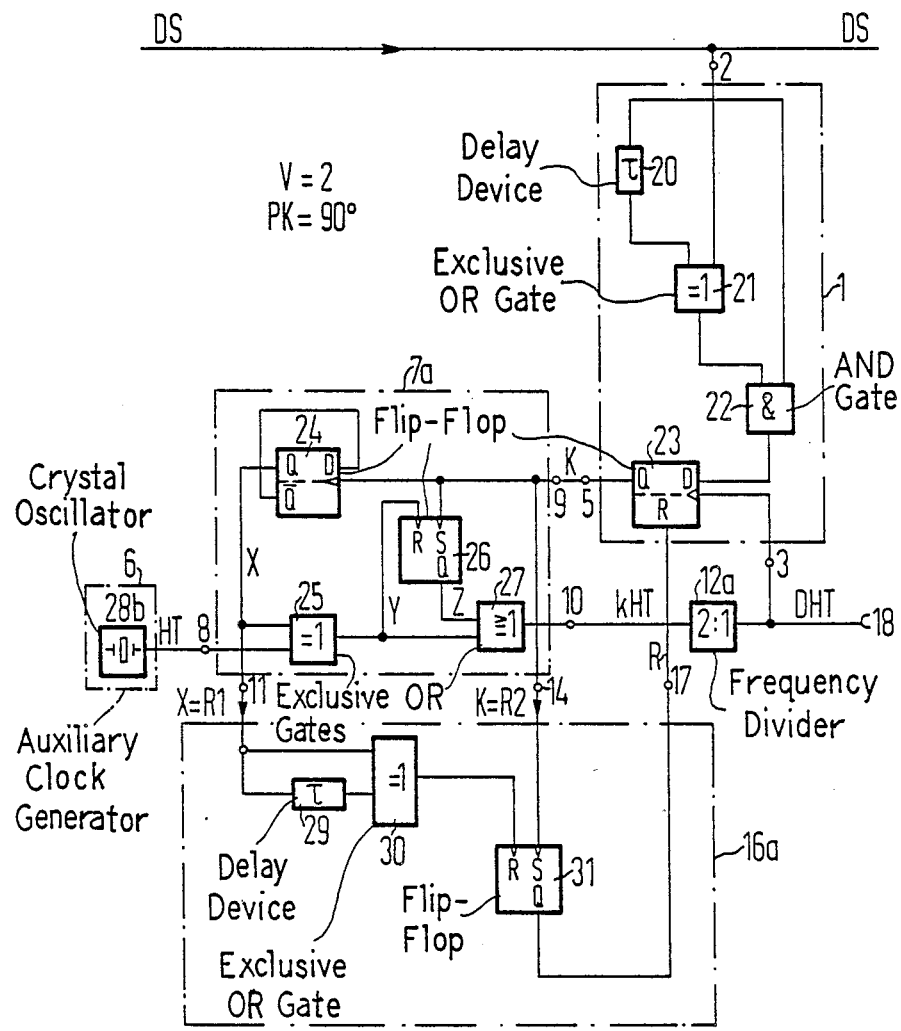
FIG. 5 is a basic circuit diagram of a second illustrative embodiment of a clock recovery circuit constructed in accordance with the invention.

FIG. 5 illustrates another variation of the clock recovery circuit according to the present invention and in accordance with FIG. 1 of a multiple factor V=2 of the nominal value of the frequency F of the digital signal DS and a phase correction PK=90°. The arrangement differs from that according to FIG. 2 by a crystal oscillator 28b which outputs an auxiliary clock HT of twice the frequency f compared with the frequency of the auxiliary clock HT in FIG. 2. Additionally, a frequency divider 12a for a dividing ratio 2:1 is also connected to follow the output 10 of the phase correction device 7a. A resetting device 16a contains a delay section 29, an EXCLUSIVE OR gate 30 and an RS flip-flop 31.

A reset device 16a becomes necessary when the transit times of the flip-flops and of the gates are no longer negligibly small with reference to the clock of the digital signal DS. The RS flip-flop 31 is set and, in further consequence, the D-type flip-flop 23 is reset when the D-type flip-flop 23 emits a correction signal K at its output Q to the output 5. The D-type flip-flop 23 is held in this state as long as the logic state at the output Q of the RS flip-flop 31 is "H". The RS flip-flop 31 remains in this state until the output Q of the D-type flip-flop 24, that is to say the pulse X, changes its state as a consequence of the correct signal K. This change results in a polarity reversal of the pulse at the output of the EXCLUSIVE OR gate 25 and therefore the desired phase correction. After the change of state of the pulse phase X, the phase correction is therefore completed. The change of state of the pulse X results in a pulse at the input R of the RS flip-flop 31 by way of the delay device 29 and the EXCLUSIVE OR gate 30. This causes the flip-flop 31 to be reset again and in further consequence the D-type flip-flop 23 to be enabled.

FIG. 6 illustrates the operation of the phase correction device 7a. The first six pulses correspond to those in FIG. 4, the seventh pulse is the auxiliary data pulse DHT which results from the corrected auxiliary clock kHT by division in the frequency divider 12a.

FIG. 7 illustrates another variation of the clock recovery facility according to the present invention in accordance with FIG. 1 for a single factor V=1 of the nominal value of the frequency F of the digital signal DS and a phase correction PK=4×90°. The arrangement differs from that of FIG. 2 by having another auxiliary clock generator 6 and another phase correction device 7b.

The auxiliary clock generator 6 comprises a crystal oscillator 28c and a subsequent frequency divider 29 for a dividing ratio 2:1 which emits two auxiliary clocks HT1 and HT2 shifted by 90°.

The phase correction device 7b comprises a plurality of EXCLUSIVE or gates 33-36 AND gates 37-40, and OR gate 41, a plurality of D-type flip-flips 42-45 and a NOR gate 46.

FIG. 8 illustrates the operation of the EXCLUSIVE OR gates 33-36 which, with the 1 shown, generates four auxiliary clocks $\phi 1-\phi 4$, which are shifted by 90° with respect to one another, at the other input in each case from the auxiliary clocks HT1 and HT 2. One of these auxiliary clocks $\phi 1-\phi 4$ in each case can be passed through a first input of one of the AND gates 37-40 and the OR gate 41 as an auxiliary data clock DHT to an output 18. The D-type flip-flops 42-45 and the NOR gate 46 act as a control facility which applies a logic state "H" to one of the second inputs of the AND gates 37-40 in each case.

If a correction signal K appears at an input 9, all of the D-type flip-flops 42-45 pass the logic state at the D input to the Q output. If a logic state "L" is present at the Q output of the D-type flip-flops 42-45, the NOR gate 46 passes a logic state "H" to the D input of the D-type flip-flop 42. This logic state is shifted through the NOR gate 46. This logic state is shifted through the D-type flip-flops 42-45 with the corrections signals K until the NOR gate 46 again outputs a logic state "H" with new logic state "L".

Figure 9:
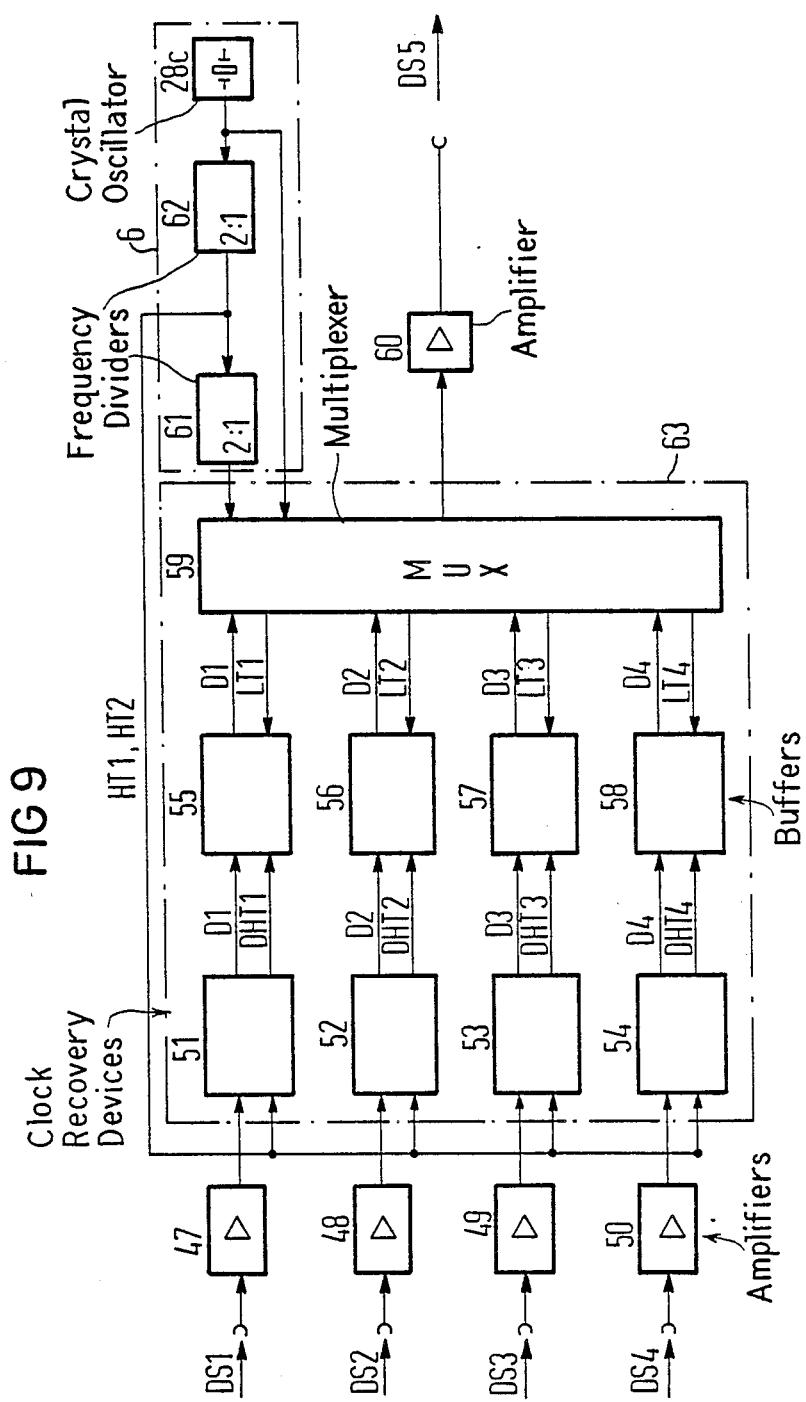
FIG. 9 is a basic circuit diagram showing four clock recovery facilities according to the present invention in a digital signal multiplex device.

FIG. 9 illustrates the multiplexer section of a digital signal multiplex device. The arrangement comprises a plurality of amplifiers 47-50 and 60, a clock recovery device 51-54, buffers 55-58, a multiplexer 59 and an auxiliary clock generator 6 including a crystal oscillator 28c, and a pair of frequency dividers 61 and 62.

The clock recovery devices 51-54, without auxiliary clock generators, buffers, 55-58 and the multiplexer 59 can be combined as an integrated circuit 63. The clock recovery circuits 51-54 can, in each case, correspond to that of FIG. 7, but only a single auxiliary clock generator 6 is required.

The reference characters D1-D4 designate data, that is to say digital signals DS1-DS4 of the clock of which has been corrected by the clock recovery devices 51-54. The reference characters LT1-LT4 designate read clocks and the reference character DS5 designates a digital signal of the next higher hierarchy level which contains the digital signals DS1-DS4.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for extracting an auxiliary data clock (DHT) from a clock and a clock phase of a digital signal (DS), comprising the steps of:

generating a first clock (HT) having a frequency (f) which is selected to be a factor (V), where V=1, 2, 3, ... n, of the nominal value of a frequency (F) of the digital signal (DS) with the addition of a frequency deviation ($\pm\Delta f$) which is greater than a permissible frequency deviation ($\pm\Delta F$), multiplied by the value of the factor (V) of the digital signal (DS), and at a maximum, 10% of the frequency (F), multiplied by the factor (V);

extracting the first clock (HT) as the auxiliary clock (DHT) when the first clock (HT) has a frequency of (f) within the range of the factor (V=1) of the nominal value of the frequency (F) of the digital signal (DS);

extracting the first clock (HT) as the auxiliary clock (DHT) when the first clock (HT) has a frequency (f) within the range of one of the factors (V=2, 3, 4, ... n) of the nominal value of the frequency (F), after first dividing the extracted clock frequency (f) by the factor;

checking whether the active edges of the digital signal (DS) and of the auxiliary data clock (DHT) have approached each other to less than a predetermined time interval ($\Delta t$);

when the active edges have approached each other to less than the predetermined time interval ($\Delta t$), generating a correction signal (K) and inhibiting generation of further correction signals;

after the occurence of the correction signal (K), correcting the phase of the auxiliary signal (DHT) by shifting the phase of the auxiliary data clock (DHT) by reversing the polarity of the extracted clock so that the time interval between the active edges of the digital signal (DS) and of the auxiliary data clock (DHT) is greater than the predetermined time interval ($\Delta t$);

after phase correction and any frequency division, cancelling the inhibition of generation of correction signals and again checking whether the active edges of the digital signal (DS) and of the auxiliary data clock (DHR) have approached each other again to less than the predetermined interval ($\Delta t$); and when the active edges of the digital signal (DS) and of the auxiliary data clock (DHT) have approached each other again to less than the predetermined time interval (Δt), again generating a correcting signal (K), inhibiting generation of further correction signals, shifting the phase of the auxiliary clock (DHT) by one of extracting a new auxiliary data clock (DHT) or reversing the polarity of an extracted clock, and again checking the phase relationship of the active signal edges.

2. The method of claim 1, further comprising the steps of:
extracting a plurality of second clocks (HTn), where n=1, 2, ... m, from the first clock, the plurality of second clocks (HTn) having the same frequency but different phase relationships with respect to one another;
selecting one of the second clocks (HTn) having a frequency (f) within the range of a single factor (V=1) of the nominal value of the frequency (F) of the digital signal to be used directly as the auxiliary data clock (DHT);
selecting one of the second clocks (HTn) which has a frequency (f) within the range of one of the multiple factors (V=2, 3, 4 ... n) of the nominal value as the auxiliary data clock (DHT) after dividing the frequency thereof by the multiple factor; and
phase shifting the auxiliary data clock (DHT) by selective switching between the extracted plurality of second clocks (HTn).

3. The method of claim 1, further comprising the steps of:
extracting a plurality of second clocks from the first clock, the plurality of second clocks having the same frequency but different phase relationships with respect to one another;
selecting one of the second clocks having a frequency (f) within the range of a single factor (V=1) of the nominal value of the frequency (F) of the digital signal to be used directly as the auxiliary data clock (DHT);
selecting one of the second clocks which has a frequency (f) within the range of a multiple factor (V=2, 3, 4, ... n) of the nominal value as the auxiliary data clock (DHT) after dividing the frequency thereof by the multiple factor; and
phase shifting the auxiliary data clock (DHT) by reversing the polarity of the extracted clock.

4. Apparatus for extracting an auxiliary data clock (DHT) from the clock of a digital signal (DS), comprising:
a fixed frequency auxiliary clock generator for generating an auxiliary clock (HT) having a fixed frequency;
a phase sensor for receiving and sensing the phase difference between the digital signal (DS) and the auxiliary clock (DHT) and producing a correction signal (K);
a phase correction device connected to said auxiliary clock generator and to said phase sensor and operable to select a fixed frequency clock generated by the auxiliary clock generator to produce a corrected auxiliary clock (kHT) as the auxiliary data clock (DHT).

5. The apparatus of claim 4, and further comprising:
a frequency divider connected between said phase correction device and said phase sensor for emitting the auxiliary data clock (DHT).

6. The apparatus of claim 5, and further comprising:
a resetting device including inputs connected to said phase correction device and to said frequency divider and an output connected to said phase sensor.

7. The apparatus of claim 4, wherein:
said auxiliary clock generator comprises a crystal oscillator.

8. The apparatus of claim 4, wherein:
said auxiliary clock generator comprises a oscillator and a frequency divider.

9. An apparatus for extracting an auxiliary data clock (DHT) from the clock of a digital signal (DS), comprising:
an auxiliary clock generator for generating an auxiliary clock (HT);
a phase sensor for receiving and sensing the phase difference between the digital signal (DS) and the auxiliary clock (DHT) and producing a correction signal (K); and
a phase correction device connected to said auxiliary clock generator and to said phase sensor and operable to select an auxiliary clock generated by the auxiliary clock generator to produce a corrected auxiliary (kHT) as the auxiliary clock (DHT); wherein
said phase correction device comprises first and second EXCLUSIVE OR gates each including first and second inputs and an output, a toggling stage including an input and an output, and an RS flip-flop including an R input, an S input and a Q input;
said first input of said first EXCLUSIVE OR gate connected to said auxiliary clock generator,
said second input of said first EXCLUSIVE OR gate connected to said output of said toggling stage,
said input of said toggling stage connected to said phase sensor,
said first input of said second EXCLUSIVE OR gate connected to said output of said first EXCLUSIVE OR gate,
said output of said second EXCLUSIVE OR gate connected to said phase sensor,
said output of said first EXCLUSIVE OR gate connected to said R input of said RS flip-flop,
said S input of said flip-flop connected to said phase sensor, and
said Q output of said RS flip-flop connected to said second input of said second EXCLUSIVE OR gate.

10. An apparatus for extracting an auxiliary data clock (DHT) from the clock of a digital signal (DS), comprising:
an auxiliary clock generator for generating an auxiliary clock (HT);
a phase for receiving and sensing the phase difference between the digital signal (DS) and the auxiliary clock (DHT) and producing a correction signal (K); and
a phase correction device connected to said auxiliary clock generator and to said phase sensor and operable to select an auxiliary clock generated by the auxiliary clock generator to produce a corrected auxiliary (kHT) as the auxiliary clock (DHT); wherein
said phase correction device comprises a plurality of EXCLUSIVE OR gates each having a first input for receiving a signal having a predetermined logic state, a second input connected to said auxiliary clock generator, and an output, a plurality of AND gates each including a first input for receiving a respective control signal, a second input connected to a respective output of said EXCLUSIVE OR gates, and an output, and a control device including a plurality of inputs connected to said outputs of said AND gates, an output for providing a corrected auxiliary clock, a correction input connected to said phase sensor, and a plurality of control outputs each connected to a respective control input of a respective AND gate.

11. The apparatus of claim 10, wherein:
said control device comprises a plurality of D flip-flops connected in a chain with a first flip-flop of said chain connected to said phase sensor, each of said D flip-flops including an output connected to a respective AND gate, a NOR gate including a plurality of inputs each connected to the output of a respective D flip-flop and an output connected to said first D flip-flop of said chain, and an OR gate including a plurality of inputs each connected to a respective output of said AND gates and an output for delivering the corrected auxiliary clock.

12. An apparatus for extracting an auxiliary data clock (DHT) from the clock of a digital signal (DS), comprising:
an auxiliary clock generator for generating an auxiliary clock (HT);
a phase sensor for receiving and sensing the phase difference between the digital signal (DS) and the auxiliary clock (DHT) and producing a correction signal (K); and
a phase correction device connected to said auxiliary clock generator and to said phase sensor and operable to select an auxiliary clock generated by the auxiliary clock generator to produce a corrected auxiliary (kHT) as the auxiliary clock (DHT); wherein
said phase sensor comprises a delay device including an input for receiving the digital signals, and an output, an EXCLUSIVE OR gate including a first input for receiving the digital signal, a second input connected to said delay device for receiving a delayed digital signal, and an output,
an AND gate including a first input connected to said output of said EXCLUSIVE OR gate, the second input connected to receive the digital signal, and an output, and
a D flip-flop including a D input connected to said output of said AND gate, a trigger input connected to said output of said phase correction device, and an output connected to said input of said phase correction device.

13. The apparatus of claim 4, wherein said phrase correction device, said phase sensor, said frequency divider and a resetting device comprise an integrated circuit.

14. An apparatus for extracting an auxiliary data clock (DHT) from the clock of a digital signal (DS), comprising:
a plurality of clock recovery devices each including a phase correction device, a phase sensor, a frequency divider and a resetting device;
a plurality of buffers, each buffer being connected to a respective clock recovery device;
an auxiliary clock generator for generating an auxiliary clock (HT), said auxiliary clock generator connected to each of said clock recovery devices, each phase sensor for receiving and sensing the phase difference between the digital signal (DS) and the auxiliary clock (DHT) and producing a correction signal (K) and each phase correction device connected to said auxiliary clock generator and to the respective phase sensor and operable to select an auxiliary clock generated by the auxiliary clock generator to produce a corrected auxiliary (kHT) as the auxiliary clock (DHT); and
a multiplexer connected to said plurality of buffers and to said auxiliary clock generator.

* * * * *